(12) United States Patent
Zhou et al.

(10) Patent No.: US 7,949,173 B2
(45) Date of Patent: May 24, 2011

(54) METHOD AND SYSTEM FOR REGRESSION-BASED OBJECT DETECTION IN MEDICAL IMAGES

(75) Inventors: Shaohua Kevin Zhou, Plainsboro, NJ (US); Jinghao Zhou, Piscataway, NJ (US); Bogdan Georgescu, Plainsboro, NJ (US); Dorin Comaniciu, Princeton Junction, NJ (US)

(73) Assignee: Siemens Corporation, Iselin, NJ (US)

( * ) Notice: Subject to any disclaimer, the term of this patent is extended or adjusted under 35 U.S.C. 154(b) by 902 days.

(21) Appl. No.: 11/866,572

(22) Filed: Oct. 3, 2007

(65) Prior Publication Data

US 2008/0085044 A1 Apr. 10, 2008

Related U.S. Application Data

(60) Provisional application No. 60/849,936, filed on Oct. 6, 2006.

(51) Int. Cl.
*G06K 9/00* (2006.01)
*A61B 6/00* (2006.01)

(52) U.S. Cl. .......................... 382/131; 382/159; 378/20

(58) Field of Classification Search .................. 382/100, 382/128, 129, 130, 131, 132.133, 134, 154, 382/155, 159, 168, 171, 173, 181, 199, 224, 382/229, 232, 254, 285–295, 305, 312; 706/12; 378/21, 20

See application file for complete search history.

(56) References Cited

U.S. PATENT DOCUMENTS

| 7,016,881 | B2 * | 3/2006 | Li et al. ............................ 706/12 |
| 7,024,033 | B2 * | 4/2006 | Li et al. ......................... 382/159 |
| 7,099,505 | B2 * | 8/2006 | Li et al. ......................... 382/159 |
| 2005/0013479 | A1 * | 1/2005 | Xiao et al. ..................... 382/159 |
| 2005/0280809 | A1 | 12/2005 | Hidai et al. |
| 2006/0147107 | A1 * | 7/2006 | Zhang et al. .................. 382/159 |
| 2007/0003147 | A1 * | 1/2007 | Viola et al. .................... 382/229 |
| 2007/0071313 | A1 * | 3/2007 | Zhou et al. .................... 382/155 |

OTHER PUBLICATIONS

Viola, P. et al. "Rapid Object Detection Using a Boosted Cascade of Simple Features," *In Proc. Conference on Computer Vision and Pattern Recognition*, (2001).
Zhou, S.K. et al., "Image Based Regression Using Boosting Method," *Tenth IEEE International conference on Computer Vision*, (2005).

* cited by examiner

*Primary Examiner* — Seyed Azarian

(57) ABSTRACT

A method and system for regression-based object detection in medical images is disclosed. A regression function for predicting a location of an object in a medical image based on an image patch is trained using image-based boosting ridge regression (IBRR). The trained regression function is used to determine a difference vector based on an image patch of a medical image. The difference vector represents the difference between the location of the image patch and the location of a target object. The location of the target object in the medical image is predicted based on the difference vector determined by the regression function.

23 Claims, 10 Drawing Sheets

 (-15,-12)  (-3,-8)  (-4,-6)
 (-5,-17)  (-7,-21)  (15,16)
 (15,-6)  (16,-5)  (17,6)
FIG. 3

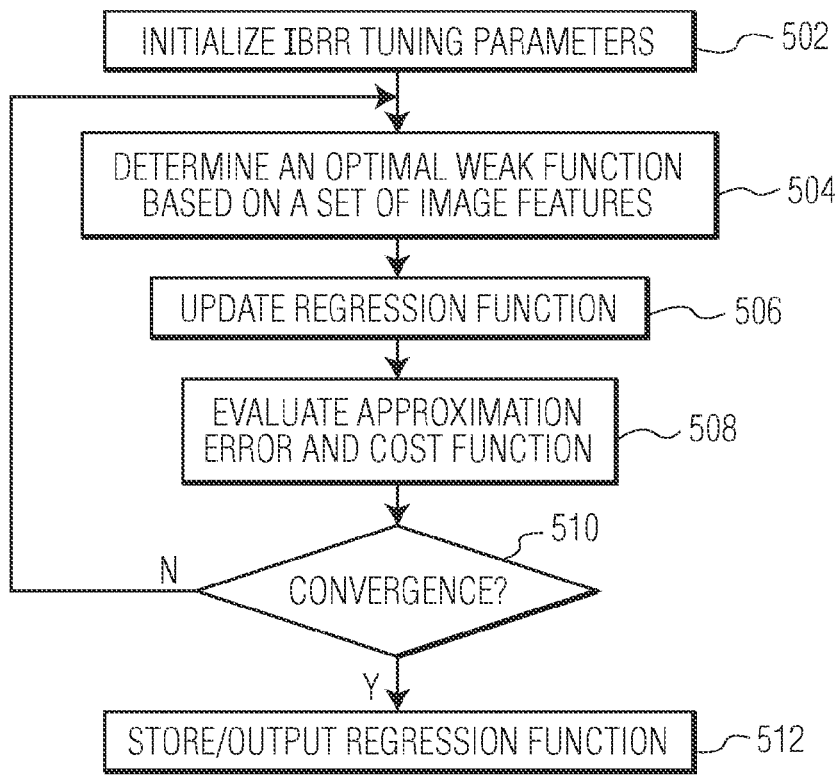

FIG. 5A

1. INITIALIZATION t = 0.

552 {
(A) SET THE FIXED A AND B (THE NORMALIZATION MATRICES), λ (THE REGULARIZATION COEFFICIENT), AND η (THE SHRINKAGE FACTOR).

(B) SET THE VALUES RELATED TO THE STOPPING CRITERIA: $T_{max}$ (THE MAXIMUM NUMBER OF ITERATIONS) AND $J_{min}$ (THE MINIMUM COST FUNCTION).

(C) SET INITIAL VALUES FOR t = 0: $g_0(x) = 0$ and $r_0(x) = y(x)$.
}

2. ITERATION t = 1,...,$T_{max}$

554 → (A) FIND THE OPTIMAL $\hat{h}_t$ USING THE FEATURE SELECTION ALGORITHM IN FIGURE 6.

556 → (B) FORM THE NEW FUNCTION $g_t(x) = g_{t-1}(x) + \eta \hat{h}_t(x)$.

558 → (C) EVALUATE THE APPROXIMATION ERROR $r_t(x) = y(x) - g_t(x)$ AND THE COST FUNCTION $J(g_t)$.

560 → (D) CHECK CONVERGENCE, E.G., SEE IF $J(g_t) < J_{min}$.

FIG. 5B

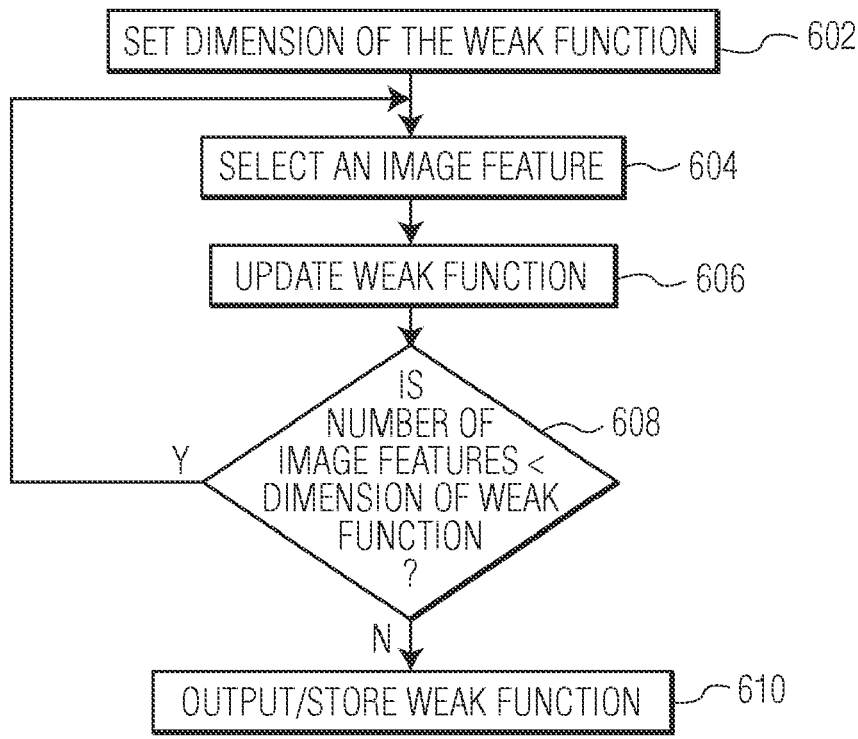

FIG. 6A

1. INITIALIZATION.

652 → • CREATE A RANDOM PERMUTATION OF {1, 2, ..., q}, YIELDING {[1], [2], ..., [q]}.

2. ITERATION OVER THE DIMENSION OF THE OUTPUT VARIABLE i = 1, 2, ..., q

653 → • (OPTIONAL) SAMPLE M' LOCAL RECTANGLE FEATURES FROM THE DICTIONARY SET AND FORM THE REDUCED SET OF WEAK FUNCTIONS H'.

• (OPTIONAL) SAMPLE N' DATA POINTS FROM THE TRAINING SET.

654 → • LOOP OVER THE FEATURE $\mu_j = 1, 2, ..., M'$ TO FIND $h_{[i]} = \arg\min_{\mu_j} J^{[i]}(\mu_j, \hat{w}_i(\mu_j))$.

656 → • FORM THE NEW VECTOR $h^{[i]} = [h^{[i-1]T}, h_{[i]}]^T$.

FIG. 6B

METHOD AND SYSTEM FOR REGRESSION-BASED OBJECT DETECTION IN MEDICAL IMAGES

This application claims the benefit of U.S. Provisional Application No. 60/849,936, filed Oct. 6, 2006, the disclosure of which is herein incorporated by reference.

BACKGROUND OF THE INVENTION

The present invention relates to object detection in medical images, and more particularly, to a regression method for detecting anatomic structures in medical images.

Detecting anatomic structures in medical images, such as ultrasound, X-rays, CT images, MR images, etc., is important for medical image understanding. For example, in order to segment an anatomic structure in a medical image, conventional techniques typically involve anatomic structure detection followed by database-guided segmentation of the anatomic structure. Anatomic structure detection can also provide valuable initialization information for other segmentation techniques such as level set, active contour, etc.

Conventional object detection techniques used to detect anatomic structures in medical images utilize a classifier-based object detection approach. Such a classifier-based object detection approach first trains a binary classifier, discriminating the anatomic structure from the background, and then exhaustively scans the query image for anatomy targets. If the trained classifier is denoted by the posterior probability $p(O|I)$, the scanning procedure mathematically performs one of the following two tasks:

$$\text{find } \{\theta : p(O|I(\theta)) > 0.5; \theta \in \Theta\} \quad (1)$$

$$\hat{\Theta} = \arg\max p(O|I(\theta)), \quad (2)$$

where $I(\theta)$ is an image patch parameterized by $\theta$, and $\Theta$ is the parameter space where the search is conducted. In (1), multiple objects are detected, and in (2), one object is detected.

The above described conventional approach reaches real time performance for detecting objects in non-medical images. In, P. Viola et al., "Rapid Object detection Using a Boosted Cascade of Simple Features," In *Proc. IEEE Conf. Computer Vision and Pattern Recognition*, pages 511-518, 2001, which is incorporated herein by reference, the classifier-based approach is used for real time frontal view face detection by exhaustively searching all possible translations and a sparse set of scales. Other approaches that detect objects under in-plane/out-of-plane rotations have been proposed, but only a sparse set of orientations and scales are tested in order to meet real time requirement. In such approaches, either multiple classifiers are learned, or one classifier is learned but multiple integral images according to different rotations are computed. In general, the computational complexity of the classifier-based approach linearly depends on the image size (for the translation parameter) and the number of tested orientations and scales.

Medical anatomy often manifests an arbitrary orientation and scale within medical images. In order to perform subsequent tasks, such as object segmentation, an accurate representation of orientation and scale may be required. Accordingly, detection speed must be sacrificed for testing a dense set of orientations and scales when using conventional detection approaches. Further, if the one classifier approach, which has been shown to perform better than the multiple-classifier approach, is used, then rotating the images and computing their associated integral images cost extra computations. Therefore, due to the exhaustive nature of the classifier-based approach, it is challenging to build a rapid detector for medical anatomy using the classifier-based approach.

BRIEF SUMMARY OF THE INVENTION

The present invention provides a regression method for object detection in medical images. Embodiments of the present invention can detect objects, such as anatomic structures, by examining one or more sparsely sampled windows instead of exhaustively scanning an image.

In one embodiment of the present invention, at least one image patch of a medical image is received. A difference vector representing a difference between the location of the image patch and a location of a target object is determined using a trained regression function. The regression function can be trained using image-based boosting ridge regression (IBRR). The location of the target object is predicted based on the difference vector. It is possible that multiple image patches are received and the multiple difference vectors corresponding to the image patches can result in multiple predictions for the location of the target object. These predictions can be averaged to determine a final estimate of the location of the target object.

In another embodiment of the present invention, training data including image patches of a training image and corresponding difference vectors can be received. A regression function for predicting a location of a target object in a medical image can be trained based on the received training data. IBRR can be used to train the regression function.

These and other advantages of the invention will be apparent to those of ordinary skill in the art by reference to the following detailed description and the accompanying drawings.

BRIEF DESCRIPTION OF THE DRAWINGS

FIG. 3 illustrates exemplary training data;

FIG. 5A illustrates a method of training a regression function using image-based boosting ridge regression according to an embodiment of the present invention;

FIG. 5B is pseudo code for implementing the method of FIG. 5A;

FIG. 6A illustrates a feature selection method according to an embodiment of the present invention;

FIG. 6B is pseudo code for implementing the method of FIG. 6A;

DETAILED DESCRIPTION

The present invention is directed to a regression method for detecting anatomic structures in medical images. Embodiments of the present invention are described herein to give a visual understanding of the anatomic structure detection method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

An embodiment of the present invention in which a regression function is trained and used to detect a left ventricle in an echocardiogram is described herein. It is to be understood that the present invention is not limited to this embodiment and may be used for detection of various objects and structures in various types of image data.

Figure 1A:
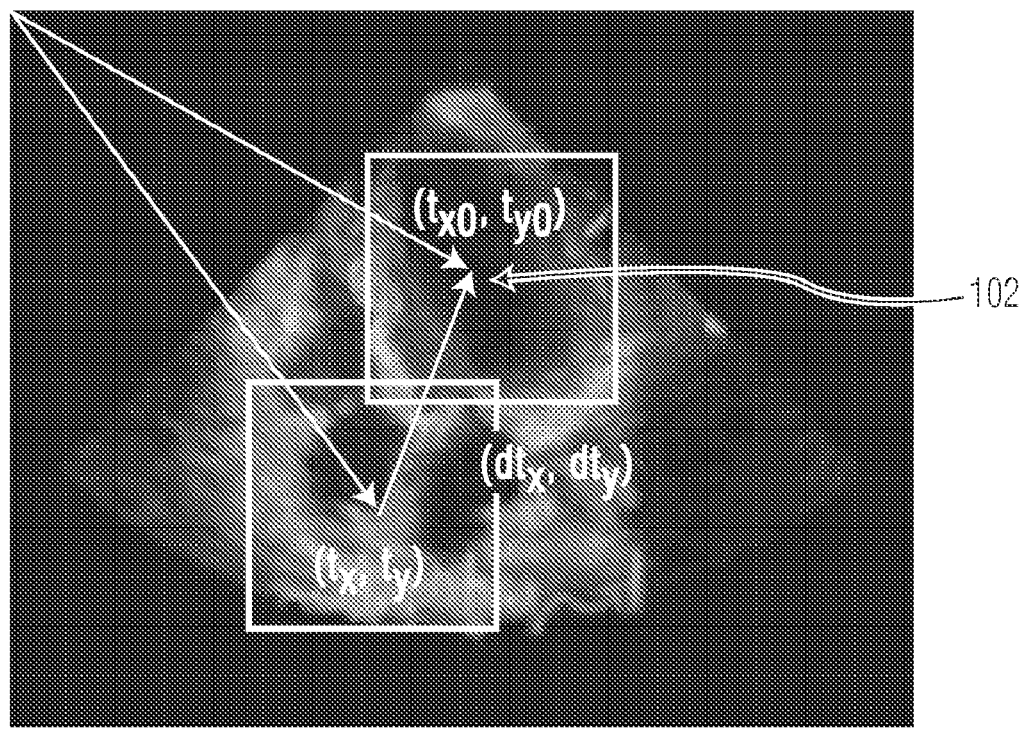
FIG. 1 illustrates the concept of regression-based anatomic structure detection according to embodiments of the present invention.
Figure 1B:
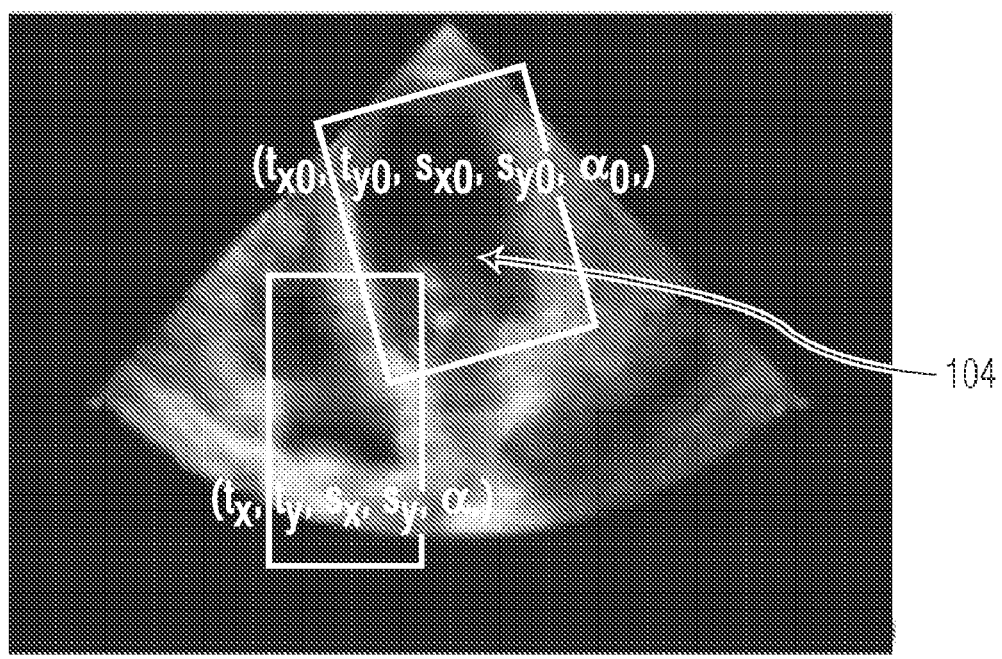

FIG. 1 illustrates the concept of regression-based anatomic structure detection according to embodiments of the present invention. Images (a) and (b) of FIG. 1 are 2D echocardiogram images of an apical four chamber (A4C) view. A 2D echocardiogram is a 2D slice of the human heart captured by an ultrasound imaging device, and the A4C view is a canonical slice where all four chambers of the heart, namely, left ventricle (LV), right ventricle (RV), left atrium (LA), and right atrium (RA), are visible. In image (a) of FIG. 1, we are interested in detecting the center position $(t_{x,0}, t_{y,0})$ of the LV 102 in the A4C echocardiogram, assuming that the orientation of the LV is upright and the scale/size of the LV is fixed. Given an image patch $I(t_x, t_y)$ centered at position $\theta=(t_x, t_y)$, it is possible, according to embodiments of the present invention, to determine a regression function F that acts as an oracle to predict the target position $(t_{x,0}, t_{y,0})$ by calculating a difference vector $d\theta=(dt_x, dt_y)$ between the current position $\theta$ and the target position $\theta_0=(t_{x,0}, t_{y,0})$, i.e., $d\theta=\theta_0-\theta$, or $$dt_x = t_{x,0} - t_x, \quad dt_y = t_{y,0} - t_y. \quad (3)$$

Using such an oracle, it is possible to achieve detection of the target anatomic structure (e.g., the LV 102) using just one scanned image patch. As used herein, the term "image patch" refers to a region of an image. The image region can be at various locations in a medical image, and can have various sizes and orientations, depending on the image patch parameter $\theta$. In other words, the oracle (regression function) provides a mapping $F: I \rightarrow (dt_x, dt_y)$, i.e., $$(dt_x, dt_y) = F(I(t_x, t_y)) \text{ or } d\theta = F(I(\theta)), \quad (4)$$

and the ground truth (target) position is estimated as:

$$\hat{\theta} = \theta + F(I(\theta)). \quad (5)$$

As described above and shown in image (a) of FIG. 1, the regression function is applied for 2D parameterization under the assumption the orientation of the LV is upright and the scale/size of the LV is fixed. Image (b) of FIG. 1 shows a 5D parameterization for modeling the LV 104 without these assumptions. The 5D parameterization used is $\theta=(t_x, t_y, \log(s_x), \log(s_y), \alpha)$: $(t_x, t_y)$ for translation, $\alpha$ for orientation, and $(s_x, s_y)$ for scale (or size) in the x and y directions. Due to the multiplicative nature of the scale parameter, we take the log operator to convert it to additive. The difference vector $d\theta = (dt_x, dt_y, ds_x, ds_y, d\alpha)$ is given as:

$$dt_x = t_{x,0} - t_x, \quad dt_y = t_{y,0} - t_y, \quad d\alpha = \alpha_0 - \alpha,$$

$$ds_x = \log(s_{x,0}) - \log(s_x), \quad ds_y = \log(s_{y,0}) - \log(s_y), \quad (6)$$

where $\theta_0 = (t_{x,0}, t_{y,0}, s_{x,0}, s_{y,0}, \alpha_0)$ is the ground truth parameter of the target.

Due to fundamental differences between generic object detection and medical anatomy detection, it is possible to learn a regression function to act as an oracle as described above. Unlike general object detection that needs to detect object instances from unconstrained scenes, medical anatomy detection applies to more constrained medical images, such as the echocardiograms shown in FIG. 1. As a result, in generic object detection, an unknown number of objects can appear at arbitrary locations in images with arbitrary background; while in medical anatomy detection, since the anatomic structure of interest conforms with the human body atlas, there is a known number of objects appearing within a pattern of geometric and appearance contexts. In medical images, there is often only one anatomic structure of interest. For example, in the echocardiograms shown in FIG. 1, there is only one target LV available, and its relation with respect to other structures, such as the LA, RV, and RA is fixed. Also, there exists a strong correlation between the relative appearances of these structures in different echocardiogram images. Accordingly, by knowing where the LA, RV, and RA are, it is possible to predict the position of the LV quite accurately.

It is well known to utilize a medical atlas as an explicit source of prior knowledge about the location, size, and shape of anatomic structures. Such a medical atlas is deformed in order to match the image content of a target image for segmentation, tracking, etc. However, embodiments of the present invention utilize atlas knowledge in an implicit approach by embedding the atlas knowledge in a learning framework for learning the regression function. Once the regression function is trained, the atlas knowledge is reflected in the regression function and the atlas does not need to be stored any longer.

Figure 2:
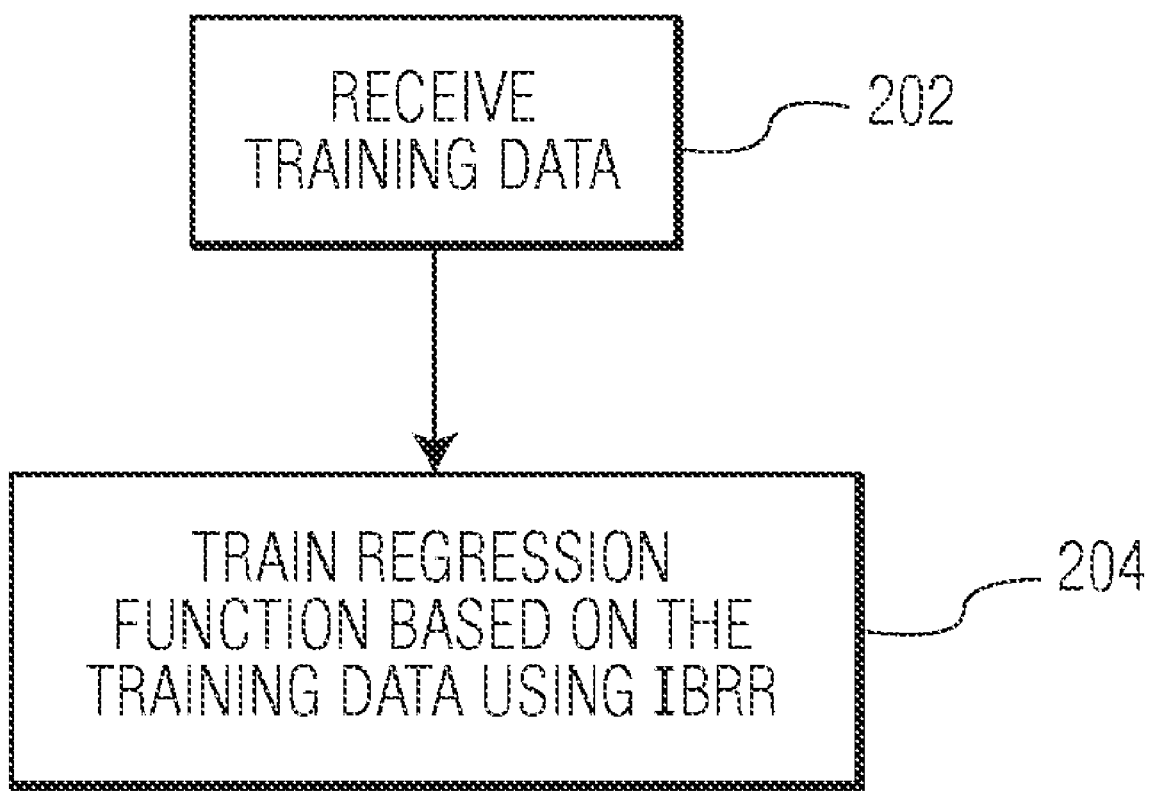
FIG. 2 illustrates a method for training a regressive function for anatomic structure detection according to an embodiment of the present invention.

FIG. 2 illustrates a method for training a regressive function for anatomic structure detection according to an embodiment of the present invention This method uses machine learning based on an annotated database in order to train the regression function.

At step 202, training data is received. FIG. 3 illustrates exemplary training data for LV detection in an echocardiogram. As illustrated in FIG. 3, the training data includes multiple input-output pairs. Each input-output pair consists of an image patch and a difference vector corresponding to the image patch. The image patch are of various local image portions of a training image, and the difference vector is the difference in the location of the center of the corresponding image patch from the center of the target anatomic structure in the training image. The training data in FIG. 3 is illustrated using the 2D parameterization assuming fixed scale and orientation for the LV. The 5D parameterization can also be used as described above. In the case of the 5D parameterization, each difference vector contains parameters for scale and orientation in addition to the position (translation) parameters shown in FIG. 3.

At step 204, a regression function is trained using image based boosting ridge regression (IBRR) based on the training data. The regression function acts as an oracle for predicting a location of a target anatomic structure based on input image patches. As used herein, the location of a target anatomic structure refers to the position, size, and orientation of the anatomic structure. In order to train the regression function, IBRR is used to generate the regression function from multiple weak function representing image features of the training image. IBRR is described in greater detail below by first describing an image-based boosting regression (IBR) training method, and then describing the IBRR training method.

The following notation is used herein for describing IBR: a is a scalar, a is a column vector, and A is a matrix. The input is denoted by $x \in R^d$, the output by $y(x) \in R^q$, the regression function by $g(x)$: $R^d \rightarrow R^1$ and the training data points by $\{(x_n, y_n); n=1, 2, \ldots, N\}$. Further, we denote $x^T A x = \|x\|_A^2$ and $tr\{X^T A X\} = \|X\|_A^2$. In medical anatomy detection $x=I$ is the image, $y=d\theta$ is the difference vector, and the regression function $g(x)=F(I)$ is the oracle.

IBR minimizes the following cost function, which combines a regression output fidelity term and a subspace regularization term:

$$J(g) = \sum_{n=1:N} \{\|y(x_n) - g(x_n)\|_A^2 + \lambda \|\mu - g_t(x_n)\|_B^2\}, \quad (7)$$

where $\lambda$ is a regularization coefficient.

IBR assumes that the regression output function $g(x)$ takes an additive form:

$$g_t(x) = g_{t-1}(x) + \alpha_t h_t(x) = \sum_{i=1:t} \alpha_i h_i(x), \quad (8)$$

where each $h_i(x)$: $R^d \rightarrow R^q$ is a weak learner (or weak function) residing in a dictionary set H, and $g(x)$ is a strong learner (or strong function). Boosting is an iterative algorithm that leverages the additive nature of $g(x)$: At iteration t, one more weak function $\alpha_t h_t(x)$ is added to the target function $g_t(x)$. Accordingly, $$J(g_t) = \sum_{n=1:N} \{\|r_t(x_n) - \alpha_t h_t(x_n)\|_A^2 + \lambda \|s_t(x_n) - \alpha h_t(x_n)\|_B^2\}, \quad (9)$$

where $r_t(x)=y(x)-g_{t-1}(x)$ and $s_t(x)=\mu-g_{t-1}(x)$.

The optimal weak function $\hat{h}$ (dropping the subscript t for notational clarity) and its weight coefficient $\hat{\alpha}$, which maximally reduce the cost function (or boost the performance) are given as follows:

$$\hat{h} = \underset{h \in H}{\operatorname{argmax}} \in (h), \; \hat{\alpha}(\hat{h}) = \frac{tr\{(AR + \lambda BS)\hat{H}^T\}}{\|\hat{H}\|_{A+\lambda B}^2}, \quad (10)$$

where $$\in (h) = \frac{tr\{(AR + \lambda BS)H^T\}}{\sqrt{\|H\|_{A+\lambda B}^2} \sqrt{\|R\|_A^2 + \lambda\|S\|_B^2}}, \quad (11)$$

and the matrices $R_{q \times N}$, $S_{q \times N}$, and $H_{q \times N}$ are defined as: $R[r(x_1), \ldots, r(x_N)]$, $S=[s(x_1), \ldots, s(x_N)]$, $H=[h(x_1), \ldots, h(x_N)]$. Finally, IBR invokes shrinkage (with the shrinkage factor $\eta=0.5$) leading to a smooth output function: $g_t(x)= g_{t-1}(x)+\eta \alpha_t h_t(x)$.

As described in S. Zhou et al., "Image-based Regression Using Boosting Method," In *Proc.* ICCV, 2005, which is incorporated herein by reference, over-complete image feature representation based on local rectangle features is used to construct one-dimensional (1D) decision stumps as primitives of the dictionary set H. This construction enables robustness to appearance variation and fast computation. Each local rectangle image feature has its own attribute $\mu$, namely feature type and window/size.

Figure 4A:
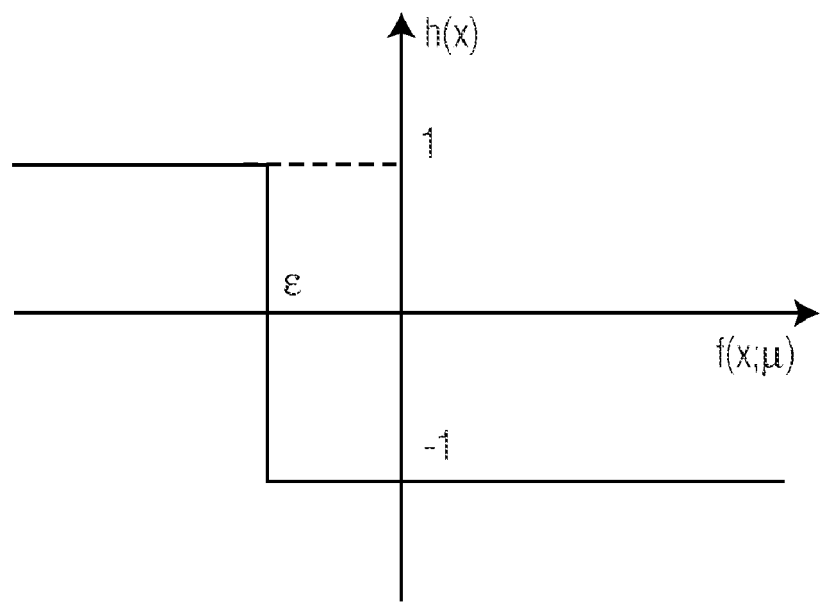
FIGS. 4A and 4B illustrate a 1D decision stump and a regression stump, respectively.

A 1D decision stump $h(x)$ is associated with a local rectangle feature $f(x;\mu)$ a decision threshold $\epsilon$, and a binary direction indicator p, i.e., $p \in \{-1,+1\}$. FIG. 4A illustrates a 1D decision stump. Such a 1D decision stump can be expressed as:

$$h(x; \mu) = \begin{cases} +1 & \text{if } pf(x;\mu) \geq p \in \\ -1 & \text{otherwise} \end{cases}. \quad (12)$$

Given a moderate image size, a large number of image features can be generated by varying their attributes. The number of features can be denoted by M. By adjusting the threshold $\epsilon$, e.g., K evenly spaced levels, K decision stumps can be created per feature, such that 2 KM 1D decision stumps are created.

A weak function is constructed as a q-dimensional (q-D) decision stump $h(x)_{q \times 1}$ that stacks q 1D decision stumps. This can be expressed as:

$$h(x; \mu_1, \ldots, \mu_q) = [h_1(x;\mu_1), \ldots, h_q(x;\mu_q)]^T. \quad (13)$$

Because each $h_j(x;\mu)$ is associated with a different parameter, it is possible to construct a sufficiently large weak function set that contains $(2KM)^q$ weak functions.

Boosting acts as a feature selector, such that at each round of boosting, the features that maximally decrease the cost function (9) are selected. However, to transform the boosting algorithm into an efficient implementation, there is computational bottleneck that is the maximization task in (10). This maximization task necessitates a greedy feature selection scheme, which can be too expensive to evaluate because it involves evaluating $(2 KM)^q$ decision stumps for each boosting iteration.

IBR utilizes an incremental feature selection scheme by breaking q-D regression problem into q dependent 1D regression problems. Using the incremental vector:

$$h^i(x)_{i \times 1} = [h_1(x), \ldots, h_i(x)]^T = [h^{i-1}(x)^T, h_i(x)]^T. \quad (14)$$

the optimal $h_i(x)$ is searched to maximize the $\epsilon(h^i)$, which is similarly defined in (11) but based on all i ($i \leq q$) dimensions processed so far. The incremental selection scheme needs to evaluate only 2qMNK decision stumps with some overhead computation while maintaining the dependence among the output dimension to some extent.

The IBR described above has two drawbacks. First, it is restrictive to use the subspace regularization term $\|\mu-g(x_n)\|_B^2$ in (7), which amounts to a multivariate Gaussian assumption about the output variable that often manifests a non-Gaussian structure for real data. As a result, the generalization capability is hampered. Second, the weak function $h(x)$ can be too "weak" as it consists of several 1D binary decision stumps $h_j(x)$ sharing the same weight coefficient $\alpha$. Consequently, the training procedure can take a long time, and the trained regression function uses too many weak functions, which can affect the running speed. IBRR, which is descried in detail below, overcomes the drawbacks of IBR by replacing the subspace regularization and enhancing the modeling strength of the weak function.

Figure 4B:
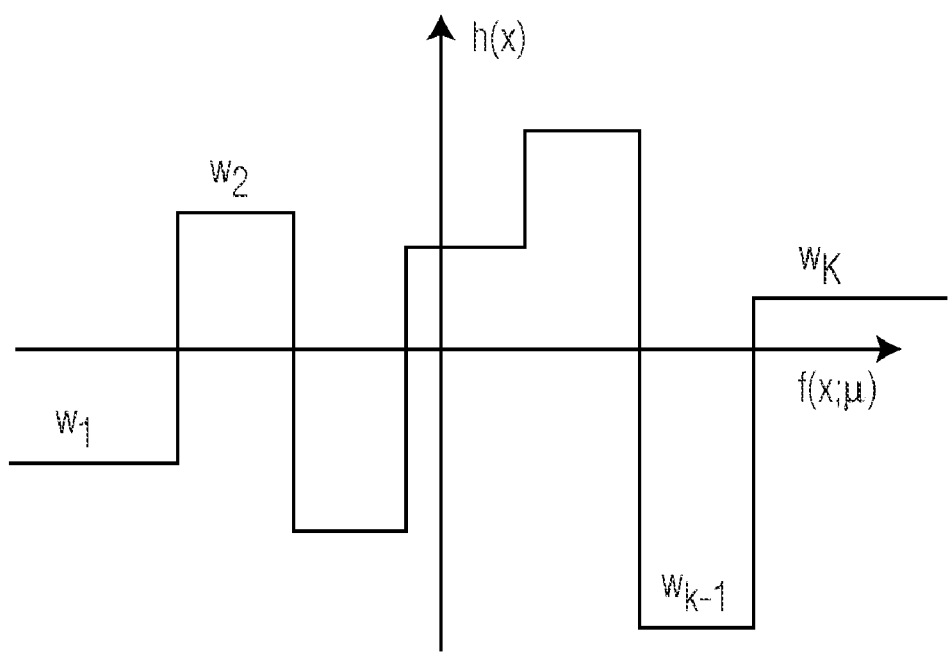

Instead of using the 1D decision stumps as primitives, the IBRR method according to an embodiment of the present invention uses regression stumps. FIG. 4B illustrates a regression stump. As illustrated in FIG. 4B, a regression stump $h(x;\mu)$ is defined as:

$$h(x;\mu) = \sum_{k=1:K} u'_k[f(x;\mu) \in R_k] = e(x;\mu)^T w, \quad (15)$$

where [.] is an indicator function, $f(x;\mu)$ is the response function of the local rectangle feature with attribute $\mu$, and $\{R_k; k=1, 2, \ldots, K\}$ are evenly spaced intervals. In (15), all the weights $w_k$ are compactly encoded by a weight vector $w_{K \times 1} = [w_1, w_2, \ldots, w_k]^T$ and the vector $e(x;\mu)$ is some column of the identity matrix: only one element is one and all others are zero. Similarly, the weak function $h(x)_{q \times 1}$ is constructed by stacking q different 1D regression stumps, i.e., $$h(x;\mu_1, \ldots, \mu_q) = [e_1(x;\mu_1)^T w_1, \ldots, e_q(x;\mu_q)^T w_q]^T. \quad (16)$$

where $w_j$ is the weight vector for the $j^{th}$ regression stump $h_j(x;\mu)$. The weights belonging to all regression stumps can be further encoded into a weight matrix $W_{K \times q} = [w_1, w_2, \ldots, w_q]$. Since we now use the weights, we drop the common coefficient $\alpha$ in the regression output function defined in (8), and instead express the regression function as follows:

$$g_t(x) = g_{t-1}(x) + h_t(x) = \sum_{i=1:t} h_i(x). \quad (17)$$

It is easy to verify that a regression stump can be formed by combining multiple decision stumps. Such a combination strengthens the modeling power of weak functions and consequently accelerates the training process. Empirical evidence shows that the training time is almost inversely proportional to the number of levels used in the weak function. Although using the regression stump brings the risk of overfitting, this risk can be ameliorated by considering the model complexity of the regression stump.

Ridge regression, also known as Tikhonov regularization, is a method of regularization for an ill-conditioned system of linear equations. According to an embodiment of the present invention, ridge regression principles are adopted into a boosting framework in order to train a regression function using IBRR.

The model complexity of the regression output function $g_t(x)$ depends on its weight matrices $\{W_1, W_2, \ldots, W_t\}$. Because boosting regression proceeds iteratively, at the $t^{th}$ boosting iteration, the following ridge regression task is performed that only involves the weight matrix $W_t$ (dropping the subscript t for notational clarity):

$$\underset{W}{\operatorname{argmin}}\left\{J(g) = \sum_{n=1:N} \{\|r(x_n) - h(x_n)\|_A^2\} + \lambda\|W\|_B^2\right\}. \quad (18)$$

Because the weight vectors $\{w_1, w_2, \ldots, w_q\}$ in the weight matrix W are associated with q different local rectangle features, the optimization in (18) implies two subtasks:
1. Given a set of q features with attributes $\mu_1, \ldots, \mu_q$, respectively, find the optimal matrix $\hat{W}(\mu_1, \ldots, \mu_q)$ and the minimum cost $\hat{J}(\mu_1, \ldots, \mu_q)$; and
2. Find the optimal set of q features with respective attributes $\mu_1, \ldots, \mu_q$ that minimizes the minimum cost $\hat{J}(\mu_1, \ldots, \mu_q)$. This corresponds to feature selection.

The optimization in (18) necessitates a greedy feature selection that may be computationally unmanageable. Accordingly, it may be advantageous to resort to a suboptimal, yet computationally amenable, incremental feature selection method. Accordingly, we introduce the following "incremental" vectors and matrices:

$$A^i = \begin{bmatrix} A^{i-1} & a^{i-1} \\ a^{i-1T} & a_i \end{bmatrix}, h^i = \begin{bmatrix} h^{i-1} \\ h_i \end{bmatrix}, r^i = \begin{bmatrix} r^{i-1} \\ r_i \end{bmatrix}.$$

Assuming that features have been selected up to i−1, that is the incremental vector $h^{i-1}(x;\mu_1, \ldots, \mu_{i-1})$ and the weight vectors $w_1, \ldots, w_{i-1}$ are known, the IBRR method aims to find the weak function $h^{i-1}(x;\mu_i) = e_i(x;\mu_i)^T w_i$ that minimizes the following ridge regression cost $J^i(\mu_i, w_i)$ (referred to herein as the IBRR cost function):

$$J^i(\mu_i, w_i) = \sum_{n=1:N} \left\{\|r^i(x_n) - h^i(x_n)\|_{A^i}^2 + \lambda\|w_i\|_B^2\right\}, \quad (19)$$

It can be derived that, for a fixed $\mu_i$, the optimal weight vector is:

$$\hat{w}_i(\mu_i) = \Gamma_i(\mu_i)^{-1} \tau_i e_i(x;\mu_i), \quad (20)$$

where $$\Gamma_i(\mu_i) = \lambda B + \sum_{n=1:N} \{e_i(x_n;\mu_i) a_i e_i(x_n;\mu_i)^T\}, \quad (21)$$

$$\tau_i = \sum_{n=1:N} \{(r^{i-1}(x_n) - h^{i-1}(x_n))^T a^{i-1} + r_i(x_n)^T a_i\}. \quad (22)$$

Accordingly, the IBRR method searches for the optimal $\mu_i$ to minimize the IBRR cost function $J^i(\mu_i, \hat{w}_i(\mu_i))$.

When $A = B = I_q$, the incremental feature selection gives the optimal solution. In this case, the optimal weight $w_{j,k}$ for the $j^{th}$ weak function is the weighted average:

$$w_{j,k} = \frac{\sum_{n=1}^{N} r_j(x_n)[f(x_n;\mu_j) \in R_k]}{\lambda + \sum_{n=1}^{N} [f(x_n;\mu_j) \in R_k]}. \quad (23)$$

The order of the dimension of the output variable can be randomly permutated in order to improve robustness and remove bias. It is also possible to improve efficiency by randomly sampling the dictionary set, i.e., replacing M with a smaller M', and randomly sampling the training data set, i.e., replacing N with a smaller N'.

FIG. 5A illustrates a method of training a regression function using IBRR according to an embodiment of the present invention. FIG. 56 is pseudo code for implementing the method of FIG. 5A. At step 502, the IBRR tuning parameters are initialized. Step 502 is shown at 552 of FIG. 5B. As shown in FIG. 5B, the normalization matrices A and B, the regularization coefficient $\lambda$, and the shrinkage factor $\eta$ are set. These may be set automatically or manually by a user. Stopping criteria, such as a maximum number of iterations $T_{max}$ and a minimum cost function value $J_{min}$ are also set. Furthermore, initial values for t=0, $g_0(x)=0$, and $r_0(x)=y(x)$ are also set.

At step 504, an optimal weak function is determined based on a set if image features. The optimal weak function is determined to minimize the IBR cost function (19). Step 504 is shown at step 554 of FIG. 5B, and described in greater detail in FIGS. 6A and 6B.

At step 506, the regression function is updated based on the optimal weak function determined in step 504. Step 506 is shown at 556 of FIG. 5B. As shown in (17) the regression function is updated at each iteration by adding the optimal weak function for that iteration to the prior regression function, such that the final regression function is the sum of the weak functions for all of the iterations. Accordingly, when the weak function is determined, it is added to the prior regression function.

At step 508, the approximation error and IBRR cost function are evaluated based on the updated regression function. The approximation error tests the regression function by comparing difference vector based on input training data resulting from the regression function to the known output training data. The IBRR cost function is expressed in (19).

At step 510, it is determined whether the IBRR method has converged. Step 510 is shown at 560 of FIG. 5B. In order for the method to converge, it is determined whether a stop condition is met. For example, convergence can be achieved if the cost function is less than the minimum cost function $J_{min}$ as shown in FIG. 5B. It is also possible that convergence is achieved when the maximum number of iterations $T_{max}$ has occurred, when the approximation error $r_t(x)$ is less than a certain threshold, when the difference between the cost function at the previous step and the current step is less than a certain threshold, or when the difference between the approximation error at the previous step and the current step is less than a certain threshold. If the IBRR method has not converged at step 510, the method returns to step 504 and repeats steps 504, 506, and 508 until convergence is achieved. If the IBRR method has converged at step 510, the method proceeds to step 512.

At step 512, the regression function is stored or output. The trained regression function resulting from the method can be stored in a memory or storage of a computer system or output for use in detecting anatomic structures in medical images.

FIG. 6A illustrates a feature selection method according to an embodiment of the present invention. This method corresponds to step 504 of FIG. 5A. FIG. 6B is pseudo code for implementing the method of FIG. 6A. At step 602, the dimension of the weak function is set. As described above, the dimension of the weak function can be permutated in order to improve robustness and remove bias. The dimension of the weak function determines how many image features are used to determine each weak function. Step 602 is shown at 652 of FIG. 6B.

At step 604, an image feature is selected to minimize the IBR cost function (19). Step 604 is shown at 654 of FIG. 6B. The image feature is selected by looping over each of the image features in the feature dictionary set M to find the feature that most minimizes the IBR cost function (19). As described above, each image feature is a local rectangle feature that is used by a 1D regression stump. As shown at 653 of FIG. 6B, it is possible that a reduced dictionary set M' be sampled from the dictionary set M and used in place of M for feature selection in order to improve computational efficiency. Also, as shown at 653 of FIG. 6B, a reduced set N' of training data may be sampled from the training set N in order to improve computational efficiency.

At step 606, the weak function is updated. As described above, the weak function is constructed by stacking q different 1D regression stumps. Each of the regression stumps uses an image feature. Once an image feature is selected at step 604, the weak function augments the current feature to previously selected features in an incremental fashion. Step 606 is shown at 656 of FIG. 6B.

At step 608, it is determined whether the number of features selected for the current weak function is less than the dimension of the weak function. If the number of features selected is less than the dimension q, the method returns to step 604 and repeats steps 604 and 606 until q image features have been selected for the weak function. Once q image features have been selected, and the number of selected image features is no longer less than the dimension of the weak function, the method proceeds to step 610.

At step 610, the weak function is output or stored. The weak function resulting from the combination of the selected features can be output for continued use in the IBRR method of FIG. 5A. The weak function may be stored in memory or storage of a computer system. The weak functions stored in each iteration of the IBRR method of FIG. 5 can be combined to generate the regression function.

Figure 7:
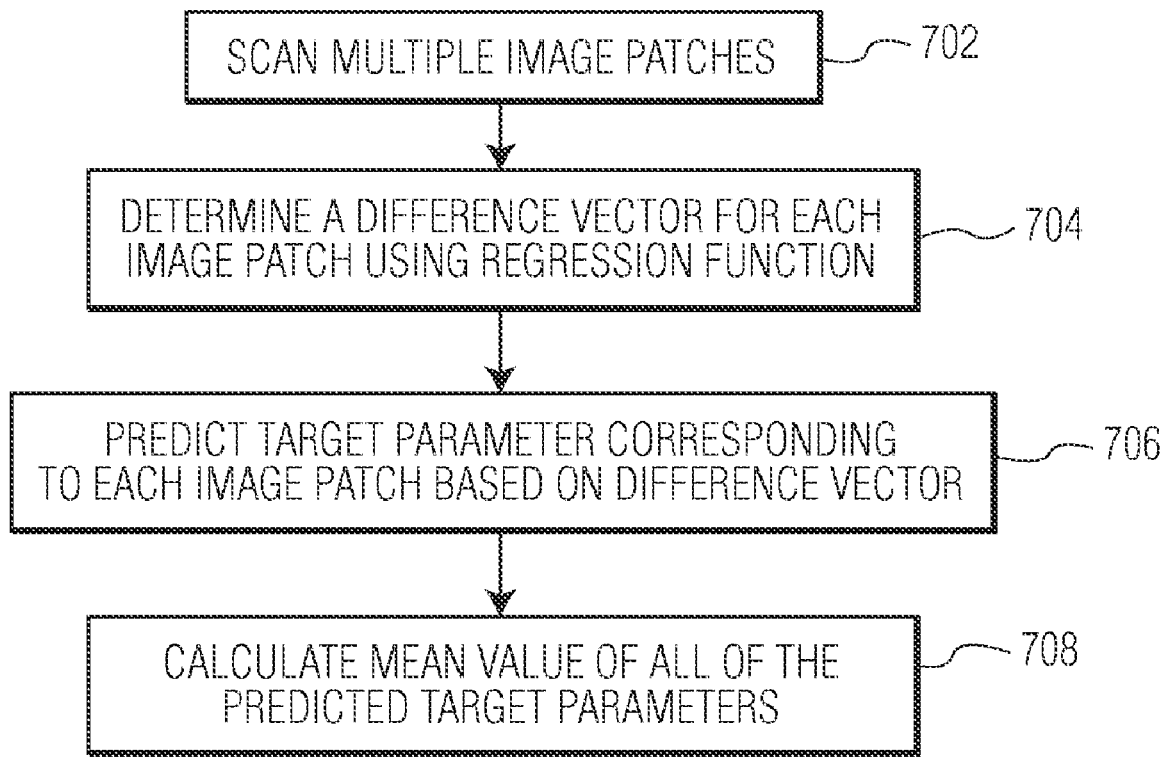
FIG. 7 illustrates a method for detecting a target object in a medical image using a trained regression function according to an embodiment of the present invention.

Once a regression function is learned, using the methods of FIGS. 5A and 6A, the regression function can be used to detect objects, such as anatomic structures, in medical images. Although, only one scanned image patch is needed to predict a location (parameter) of the target object using the learned regression function, it is possible to utilize multiple scan to increase accuracy and robustness of the estimated object location. FIG. 7 illustrates a method for detecting a target object in a medical image using a trained regression function according to an embodiment of the present invention.

At step 702, multiple image patches are scanned. According to a possible implementation, the method can scan a certain number of random image patches. Accordingly, M random image patches can be scanned at positions $\{\theta\langle^1\rangle, \theta\langle^2\rangle, \ldots, \theta\langle_M\rangle\}$. As described above, the location or position of the image patches can be expressed using the 2D parameter or the 5D parameter.

At step 704, a difference vector is determined for image patch using the trained regression function. Accordingly, for each $\theta\langle^m\rangle$, the trained regression function is invoked to determine a difference vector $d\theta\langle^m\rangle$. The difference vector (or difference parameter) $d\theta\langle^m\rangle$ represents the difference between the location $\theta\langle^m\rangle$ of the image patch and a location $\theta_0\langle^m\rangle$ of the target object in the medical image. This step can be expressed as:

$$d\theta^{<m>}=F(I(\theta^{<m>})), m=1, 2, \ldots, M \tag{24}$$

where F is the learned regression function.

At step 706, a target parameter $\theta_0\langle^m\rangle$ (i.e., the location of the target object in the medical image) is predicted corresponding to each image patch based on the difference vector determined for the image patch. Accordingly, multiple target parameters are predicted corresponding to the multiple image patches. This step can be expressed as:

$$\theta_0^{<m>}=\theta^{<m>}+d\theta^{<m>}, m=1, 2, \ldots, M \tag{25}$$

At step 708, a mean value of all of the predicted target values $\theta_0\langle^m\rangle$ is calculated in order to determine a final estimate of the location of the target object. The M predictions $\{\theta_0\langle^m\rangle; m=1, 2, \ldots, M\}$ are treated as independent and their mean value is calculated as the final estimate $\hat{\theta}_0$ for the ground truth parameter, as follows:

$$\hat{\theta}_0 = M^{-1} \sum_{m=1:M} \theta_0^{<m>}. \quad (26)$$

One possible disadvantage to the IBRR method of the present invention is that it lacks a confidence measure, i.e., the regression function tells no confidence regarding its prediction. In order to provide a confidence score, it is possible to learn a binary detector D specialized for the anatomy of interest. After finding the $m^{th}$ prediction $\theta_0^{<m>}$ in the method of FIG. 7, it is possible to apply the detector D to the image patch $I(f_0^{<m>})$. If the detector D fails, then the $m^{th}$ sample can be discarded; otherwise, the confidence score $c^m$ resulting from the detector D is kept. Accordingly, we have a weighted set $\{(f_0^{<j>}, c^{<j>}): j=1, 2, \ldots, J\}$ (note that $J \leq M$ as samples may be discarded), based on which the weighted mean can be calculated as the final estimate $\hat{\theta}_0$, as follows:

$$\hat{\theta}_0 = \left\{ \sum_{j=1:J} c^{<j>} \theta_0^{<j>} \right\} / \left\{ \sum_{j=1:J} c^{<j>} \right\}. \quad (27)$$

In practice, it is possible to specify a value $J_{valid}$ such that scanning is stopped when $J \geq J_{valid}$ in order to reduce computation. If there is no prediction $\theta_0^{<m>}$ passing the detector D, the (26) can be used instead of (27) as the final estimate as described in step 708 of FIG. 7.

Figure 8:
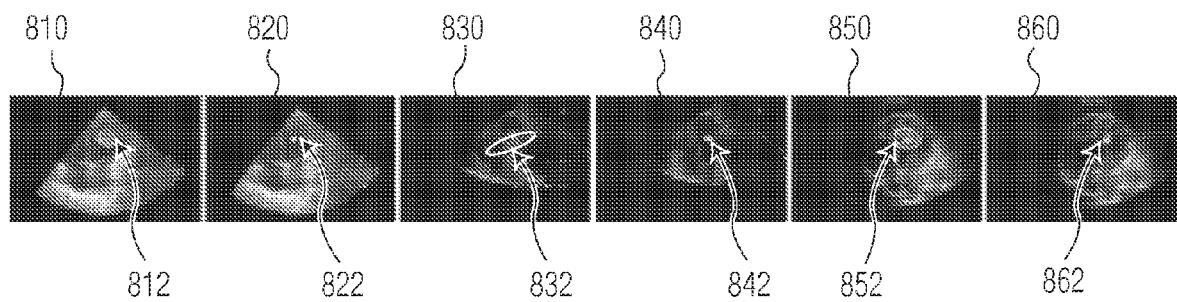
FIG. 8 illustrates exemplary anatomic structure detection results using a 2D parameterization according to an embodiment of the present invention.

FIG. 8 illustrates exemplary anatomic structure detection results using a 2D parameterization according to an embodiment of the present invention. As illustrated in FIG. 8, the above described methods are used to detect a location of the left ventricle in echocardiogram images 810, 820, 830, 840, 850, and 860. using the 2D parameterization a center point 812, 822, 832, 842, 852, and 862 of the left ventricle is estimated in the images 810, 820, 830, 840, 850, and 860, respectively. In images 810, 830, and 850, the center points 812, 832, and 852 are determined based on the mean of 100 predicted target outputs using equation (26). In images 820, 840, and 860, the center points 822, 842, and 862 are determined based on only predicted outputs that pass a binary detector, using equation (27). The curve surrounding the center points 812, 822, 832, 842, 852, and 862 in each of the images 810, 820, 830, 840, 850, and 860 represents a 95% confidence curve.

Figure 9:
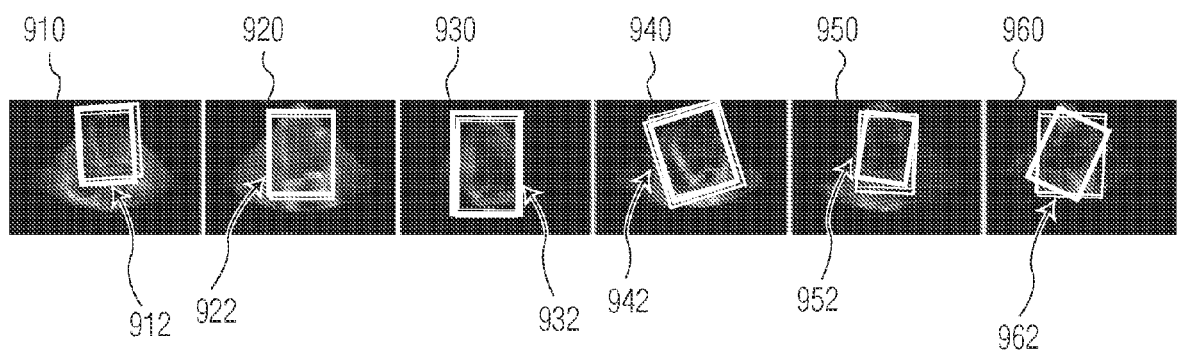
FIG. 9 illustrates exemplary anatomic structure detection results using a 5D parameterization according to an embodiment of the present invention.

FIG. 9 illustrates exemplary anatomic structure detection results using a 5D parameterization according to an embodiment of the present invention. As illustrated in FIG. 9, the above described methods are used to detect a location (position, orientation, and scale) of the left ventricle in echocardiogram images 910, 920, 930, 940, 950, and 960. In the images 910, 920, 930, 940, 950, and 960, a window 912, 922, 932, 942, 952, and 962 representing the location of the left ventricle is determined. As shown in the images 920, 930, 940, 950, and 960, three boxes are shown for each of the detected windows 912, 922, 932, 942, 952, and 962. The lightest grey box represents the detection result using a binary classifier in addition to the IBRR trained regression function (equation (27)). The medium grey box (mostly overlapping the lightest grey box in each image) represents the detection result using the IBRR trained regression function without a binary classifier (equation (26)). The darkest grey box represents the ground truth location of the target for each image 920, 930, 940, 950, and 960.

Figure 10:
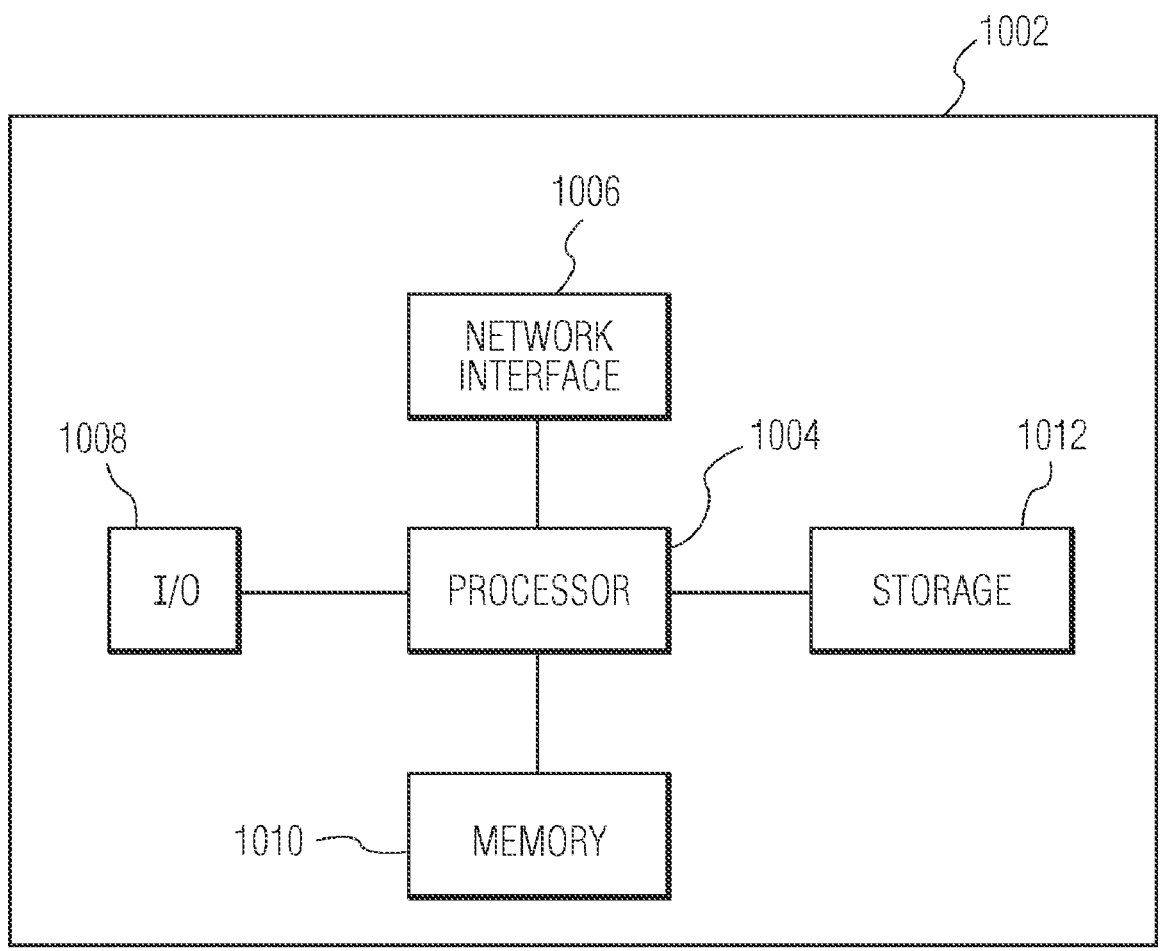
FIG. 10 is a high level block diagram of a computer capable of implementing the present invention.

The above-described methods for training a regression function and object detection using a trained regression function may be implemented on a computer using well-known computer processors, memory units, storage devices, computer software, and other components. A high level block diagram of such a computer is illustrated in FIG. 10. Computer 1002 contains a processor 1004 which controls the overall operation of the computer 1002 by executing computer program instructions which define such operation. The computer program instructions may be stored in a storage device 1012 (e.g., magnetic disk) and loaded into memory 1010 when execution of the computer program instructions is desired. Thus, applications for training a training a regression function using IBRR and predicting an object location using a trained regression function may be defined by the computer program instructions stored in the memory 1010 and/or storage 1012 and controlled by the processor 1004 executing the computer program instructions. Furthermore, training data, testing data, the trained regression function, and data resulting from object detection using the trained regression function can be stored in the storage 1012 and/or the memory 1010. The computer 1002 also includes one or more network interfaces 1006 for communicating with other devices via a network. The computer 1002 also includes other input/output devices 1008 that enable user interaction with the computer 1002 (e.g., display, keyboard, mouse, speakers, buttons, etc.) One skilled in the art will recognize that an implementation of an actual computer could contain other components as well, and that FIG. 10 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for detecting a target object in a medical image, comprising:
    determining a difference vector corresponding to at least one image patch of a medical image using a trained regression function, said difference vector representing a difference between a location of said at least one image patch and a location of a target object in said medical image; and
    predicting a location of said target object in said medical image based on said difference vector and predicting a position of a center point of said target object.
2. The method of claim 1, further comprising:
    receiving said at least one image patch.
3. The method of claim 1, further comprising:
    scanning a plurality of image patches at random locations in said medical image prior to said determining step.
4. The method of claim 3, wherein said step of determining a difference vector corresponding to at least one image patch comprises:
    determining a plurality of difference vectors, each corresponding to one of said plurality of image patches, using said trained regression function.

5. The method of claim 4, wherein said step of predicting a location of said target object comprises:
  calculating a plurality of target object location predictions, each based on one of said plurality of difference vectors; and
  calculating a mean of the plurality of target object location predictions.

6. The method of claim 4, wherein said step of predicting a location of said target object comprises:
  calculating a plurality of target object location predictions, each based on one of said plurality of difference vectors;
  processing each of said plurality of target object location predictions using a trained binary classifier; and
  calculating a weighted mean of the plurality of target object location predictions based on results of said binary classifier.

7. The method of claim 1, wherein said step of predicting a location of said target object comprises:
  predicting a position, size, and orientation of said target object.

8. The method of claim 1, wherein said trained regression function comprises a plurality of weak functions, each weak function representing at least one image feature.

9. The method of claim 1, wherein said regression function is trained using image-based boosting ridge regression.

10. A method comprising:
  receiving training data including a plurality of image patches of a training image and a plurality of difference vectors, each of said plurality of difference vectors corresponding to one of said plurality of image patches and each of said plurality of difference vectors providing a difference between a location of the corresponding image patch and a target object in said training image; and
  training a regression function based on said training data using image-based boosting ridge regression (IBRR), said regression function for predicting a location of a target object in a medical image based on at least one input image patch of the medical image.

11. The method of claim 10, wherein said step of training said regression function based on said training data using IBRR comprises:
  (a) determining a weak function to minimize an IBRR cost function, said weak function based on at least one image feature;
  (b) updating said regression function based on said weak function;
  (c) evaluating approximation error and said IBRR cost function based on the updated regression function; and
  (d) repeating steps (a)-(c) until a predetermined stop condition is met.

12. The method of claim 11, wherein step (a) comprises:
  iteratively selecting a number of optimal image features based on said IBRR cost function, the number of image features corresponding to a dimension of said weak function;
  combining the selected image features to generate said weak function.

13. The method of claim 12, wherein each of said image features is used by a regression stump.

14. The method of claim 11, wherein step (d) comprises:
  repeating steps (a)-(c) until at least one of said approximation error and said IBRR cost function converges.

15. An apparatus for detecting a target object in a medical image, comprising:
  means for storing a trained regression function for predicting a location of a target object;
  means for processing at least one image patch of a medical image using said trained regression function to determine a difference vector corresponding to said at least one image patch, said difference vector representing a difference between a location of said at least one image patch and a location of said target object in said medical image; and
  means for predicting a location of said target object in said medical image based on said difference vector and predicting a position of a center point of said target object.

16. The apparatus of claim 15, further comprising:
  means for receiving a plurality of image patches of said medical image, wherein said means for processing at least one image patch comprises processing said plurality of image patches using said trained regression function to determine a plurality of difference vectors, each corresponding to one of said plurality of image patches.

17. The apparatus of claim 16, wherein said means for predicting a location of said target object comprises:
  means for calculating a plurality of target object location predictions, each based on one of said plurality of difference vectors; and
  means for calculating a mean of the plurality of target object location predictions.

18. An apparatus comprising:
  means for receiving training data including a plurality of image patches of a training image and a plurality of difference vectors, each of said plurality of difference vectors corresponding to one of said plurality of image patches and each of said plurality of difference vectors providing a difference between a location of the corresponding image patch and a target object in said training image; and
  means for training a regression function based on said training data using image-based boosting ridge regression (IBRR), said regression function for predicting a location of a target object in a medical image based on at least one input image patch of the medical image.

19. The apparatus of claim 18, wherein said means for training a regression function comprises:
  means for iteratively determining a plurality of weak functions to minimize an image-based boosting ridge regression (IBRR) cost function, each of said weak functions based on at least one image feature;
  means for combining said plurality of weak functions to generate said regression function.

20. The apparatus of claim 19, wherein said means for iteratively determining a plurality of weak functions comprises:
  means for iteratively selecting a number of optimal image features for a weak function based on said IBRR cost function, the number of image features corresponding to a dimension of the weak function;
  combining the selected image features to generate the weak function.

21. A computer readable medium encoded with computer executable instructions for detecting a target object in a medical image, the computer executable instructions defining steps comprising:
  determining a difference vector corresponding to at least one image patch of a medical image using a trained regression function, said difference vector representing a difference between a location of said at least one image patch and a location of a target object in said medical image; and predicting a location of said target object in said medical image based on said difference vector and predicting a position of a center point of said target object.

22. The computer readable medium of claim 21, further comprising computer executable instructions defining the step of:

scanning a plurality of image patches at random locations in said medical image prior to said determining step, wherein the computer executable instructions defining the step of determining a difference vector corresponding to at least one image patch comprise computer executable instructions defining the step of determining a plurality of difference vectors, each corresponding to one of said plurality of image patches, using said trained regression function.

23. The computer readable medium of claim 22, wherein the computer executable instructions defining the step of predicting a location of said target object comprise computer executable instructions defining the steps of:

calculating a plurality of target object location predictions, each based on one of said plurality of difference vectors; and calculating a mean of the plurality of target object location predictions.

* * * * *